(12) United States Patent
Thompson

(10) Patent No.: US 7,344,163 B2
(45) Date of Patent: Mar. 18, 2008

(54) TRUNKING SECTIONS AND COUPLING THEREFOR

(76) Inventor: Richard John Thompson, 7 Holywood, Wolsingham County Durham DL13 3HE (GB)

( * ) Notice: Subject to any disclaimer, the term of this patent is extended or adjusted under 35 U.S.C. 154(b) by 0 days.

(21) Appl. No.: 10/526,882

(22) PCT Filed: Aug. 19, 2003

(86) PCT No.: PCT/GB03/03728

§ 371 (c)(1),
(2), (4) Date: Oct. 13, 2005

(87) PCT Pub. No.: WO2004/023618

PCT Pub. Date: Mar. 18, 2004

(65) Prior Publication Data

US 2008/0007047 A1    Jan. 10, 2008

(30) Foreign Application Priority Data

Sep. 6, 2002  (GB) .................................. 0220672.0

(51) Int. Cl.
*F16L 11/118* (2006.01)
(52) U.S. Cl. .................. 285/149.1; 285/370; 285/424; 285/151.1; 138/92; 138/155; 174/68.3; 29/272
(58) Field of Classification Search ............ 285/149.1, 285/151.1, 424, 370; 138/92, 155; 174/68.3; 174/101
See application file for complete search history.

(56) References Cited

U.S. PATENT DOCUMENTS

| | | | |
|---|---|---|---|
| 2,757,946 A * | 8/1956 | Weig | 285/419 |
| 2,905,201 A * | 9/1959 | McNaughton | 285/419 |
| 3,023,032 A * | 2/1962 | Johnston et al. | 285/149.1 |
| 3,338,599 A * | 8/1967 | Hallman | 285/284.1 |
| 3,351,699 A * | 11/1967 | Merckle | 174/371 |
| 4,077,434 A * | 3/1978 | Sieckert et al. | 138/92 |
| 4,349,220 A * | 9/1982 | Carroll et al. | 285/151.1 |
| 5,213,374 A * | 5/1993 | Keating | 285/424 |
| 5,435,606 A * | 7/1995 | Navazo | 285/149.1 |
| 6,107,576 A * | 8/2000 | Morton et al. | 174/101 |
| 6,832,786 B2 * | 12/2004 | Duncan et al. | 285/424 |

(Continued)

FOREIGN PATENT DOCUMENTS

DE    23 65 732    3/1976

(Continued)

*Primary Examiner*—David Bochna
(74) *Attorney, Agent, or Firm*—Zilka-Kotab, PC

(57) ABSTRACT

A section of trunking (20) has sides (22) which define a channel (34). Edge portions (32) of sides (22) are shaped so as to form further channels (34); Lid (26) has surface (29) and edge portions (30) which extend over channels (34) so as to form enclosed volumes. Screws (36) are used to fix lid (36) onto trunking section (20). Any water leaking through holes (38) and down the threads of screws (36) will be retained within channel (34) and will eventually dissipate between the side portion (30) of lid (26) and side (22) of trunking section (20). Trunking sections (20) are coupled by coupling (50) which is formed from surfaces (52, 54, 56, 58, 60, 62 64 and 66) which themselves engage internal surfaces of the trunking sections and their respective lids. Coupling (50) is provided with pairs of threaded holes.

14 Claims, 6 Drawing Sheets

U.S. PATENT DOCUMENTS 6,934,456 B2 * 8/2005 Ferris et al. ................ 385/134
7,041,897 B2 * 5/2006 Herzog ....................... 174/500

FOREIGN PATENT DOCUMENTS

| | | |
|---|---|---|
| DE | 1 465 398 | 2/1977 |
| GB | 1138776 | 1/1969 |
| GB | 2 233 162 | 1/1991 |
| GB | 2 347 794 | 9/2000 |
| GB | 2 390 489 | 1/2004 |
| GB | 2 390 490 | 1/2004 |

* cited by examiner

TRUNKING SECTIONS AND COUPLING THEREFOR

CROSS-REFERENCE TO RELATED APPLICATIONS

The present application claims the priority of a United Kingdom patent application filed Sep. 6, 2002 under application number 0220672.0, which is incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The present invention relates to trunking and particularly, but not exclusively, to waterproof trunking used for carrying electrical cables.

The carrying of electrical cables in a network of trunking is used in many industries. In the food, beverage and pharmaceutical industries, where hygiene is of paramount importance, stainless steel trunking is regularly used. It is important that such trunking is easily cleaned and that places where dirt may gather, and infestation may occur, are kept to a minimum. In some situations it is necessary to provide waterproof trunking. For example, where trunking is located near a high ceiling the preferred method of cleaning maybe to direct a jet of water at the trunking from the ground.

An example of trunking of the prior art is shown in FIGS. 1 and 2. From the figures it can be seen that trunking section 10 has a lip 12 extending away from the remainder of trunking section 10. Lip 12 extends outside the main body of trunking section 10 because there is a danger that water can leak around the thread of screw 14 and through seal 16. If lip 12 extended within the internal volume of trunking section 10 there is a danger that the cables therein would become wet. However, the lip 12 makes the trunking difficult to clean and when in use, the lid 18 and the base of the screws 14 create numerous dirt traps, making this sort of trunking unsuitable for circumstances where very high hygiene standards are required. Furthermore, this form of trunking is unsuitable for installation against a wall as a gap, the width of the lip 12, must exist between the external wall of the trunking section 10 and the wall that is located adjacent. This gap increases the difficulty in cleaning this form of trunking.

An alternative trunking system used in the above mentioned industries is shown in FIG. 3. In such a system, a coupling for joining two lengths of trunking 1 and 2, utilises an internal fixing mechanism consisting of a coupling 5, having slots 6 and 7 cut therein. These slots align with threaded studs 3 and 4 onto which bolts (not shown) are tightened thus holding the coupling 5 in engagement with trunking lengths 1 and 2. This system provides a smooth joint between the trunking sections 1 and 2, therefore allowing the outside surfaces of the trunking to remain free from dirt traps. However, this system has only four fixing points to join two sections of trunking, and as a result such joints in a trunking system are unsuitable for spanning a distance greater than a single length of trunking unsupported. Furthermore, if one or more of the four fixing points are not sufficiently tightened the trunking sections can be easily separated.

Preferred embodiments of the present invention seek to overcome the above described disadvantages of the prior art.

BRIEF SUMMARY OF THE INVENTION

According to an aspect of the present invention there is provided a trunking section comprising:

at least one side, the or each side adapted to define a first channel for receiving electrical cables and adapted to receive at least one lid, thereby defining a first volume, at least two opposing edge portions of the side, or of at least two of the sides, being shaped so as to form at least two second channels, and a respective further portion of said side and/or a respective portion of at least one lid being adapted to close each second channel and thereby define at least two second volumes.

By providing a trunking section with two second channels which define two second volumes separated from the cable carrying first channel, the advantage is provided that when used in conjunction with a suitable lid the trunking sections and lids from easily clean surfaces with fewer dirt traps than those of the prior art. This is achieved whilst maintaining the waterproofing of the first channel by isolating any screws used to attach the lid to the sides of the trunking section from the second channel with the screws in. As a result in the event that water can run down the thread of such a screw it cannot enter the cable carrying channel.

In a preferred embodiment said first channel is an elongate channel.

In another preferred embodiment said second channel extends along the whole length of the respective side.

In a further preferred embodiment said second channels are within said first volume.

By locating the second channels within the first volume the advantage is provided that this arrangement makes the most efficient use of the external dimensions of the section and lid. For example if the trunking section is to be placed against a wall there will be no significant gap between the trunking and the wall. As a result, the trunking and wall have less dirt traps and are easier to clean.

In a preferred embodiment at least a portion of at least one of said sides is substantially planar and in use substantially vertical, and said second channel is defined by a first channel side extending substantially perpendicularly to said portion, a second channel side extending substantially parallel to said side portion, and a third channel side extending substantially parallel to said first channel side.

The trunking section may further comprise a fourth channel side substantially parallel to said second channel side, said first, second, third and fourth channel sides thereby defining said second volume.

In a preferred embodiment said second volumes are adapted to receive lid retaining means therein.

In a preferred embodiment a portion of said side is provided with a threaded hole and adapted to receive lid retaining means in the form of a screw.

By adapting the second channels to receive lid retaining means therein the advantage is provided that any leakage through the lid from the retaining means is retained within the volumes of the second channels and is therefore separated from the first channel which typically carries cable.

According to another aspect of the present invention, there is provided a coupling for joining a first trunking section having at least one respective lid to a second trunking section having at least one respective lid, the coupling comprising:

a plurality of surfaces adapted to engage internal surfaces of first and second trunking sections and internal surfaces of respective lids;

retaining means for retaining the first and second trunking sections and respective lids in engagement with said surfaces; and a sealing coating adapted to substantially seal the internal surfaces of said trunking sections and respective lids and said surfaces.

By having surfaces coated with a sealing coating to engage internal surfaces of adjacent trunking sections and their respective lids, the advantage is provided that a waterproof seal between the sections of trunking at their joints can be provided. Furthermore because the coupling engages the trunking sections and the lid the coupling can be used to improve the seal between the adjacent lids. This coupling also forms a more rigid joint between the trunking sections and lids since both the trunking sections and lids attached through the holes therein.

In a preferred embodiment said retaining means are holes in said coupling, which are adapted to engage with screws or bolt extending through respective holes in said trunking sections and said lids and into said holes in said couplings.

In another preferred embodiment said holes in said coupling are threaded.

The coating may be neoprene.

In a further preferred embodiment said coating is applied by a dipping process.

BRIEF DESCRIPTION OF THE SEVERAL VIEWS OF THE DRAWINGS

Preferred embodiments of the present invention will now be described by way of example only, and not in any limitative sense, with reference to the accompanying drawings, in which.

DETAILED DESCRIPTION OF THE INVENTION

Figure 1:
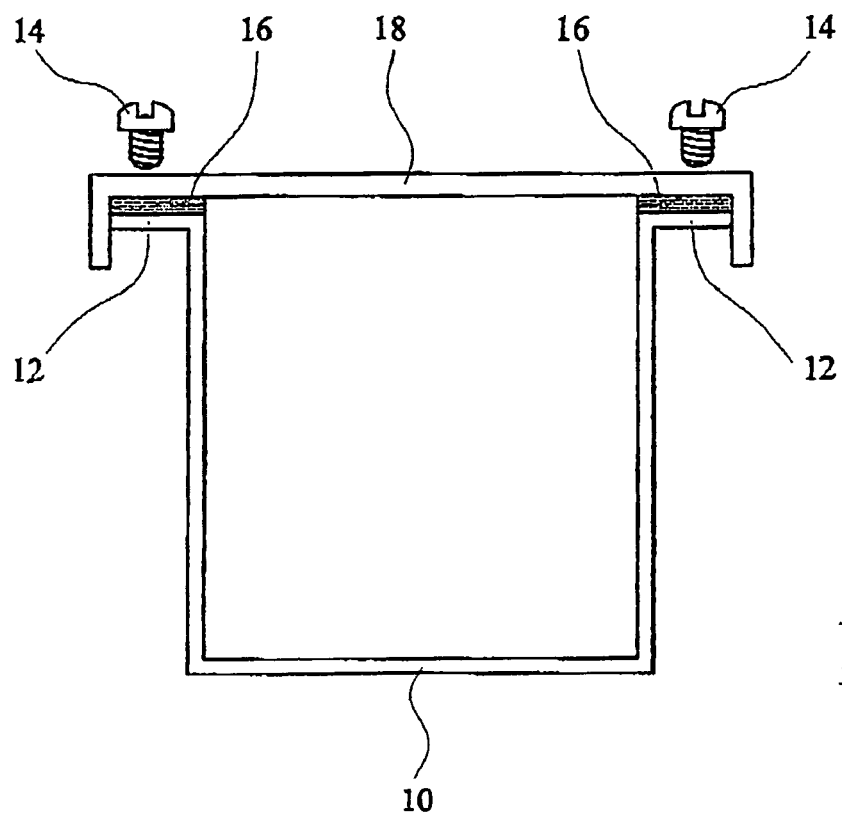
FIG. 1 is an end view of a trunking section and lid of the prior art.
Figure 2:
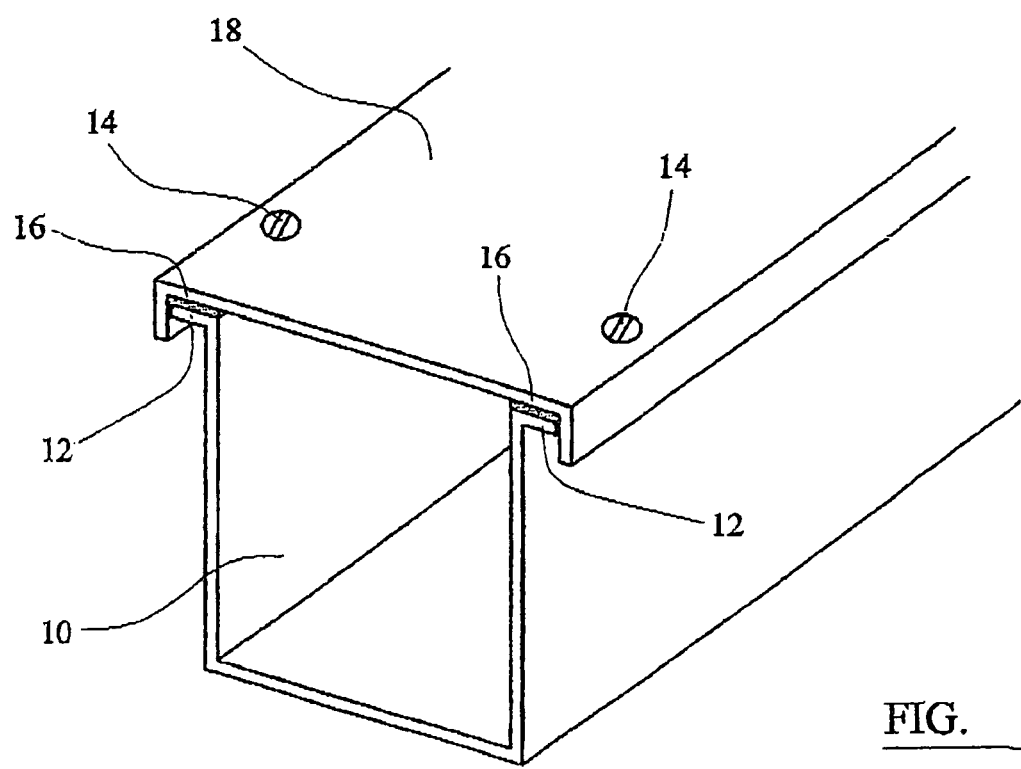
FIG. 2 is a perspective view of the trunking section and lid of FIG. 1.
Figure 3:
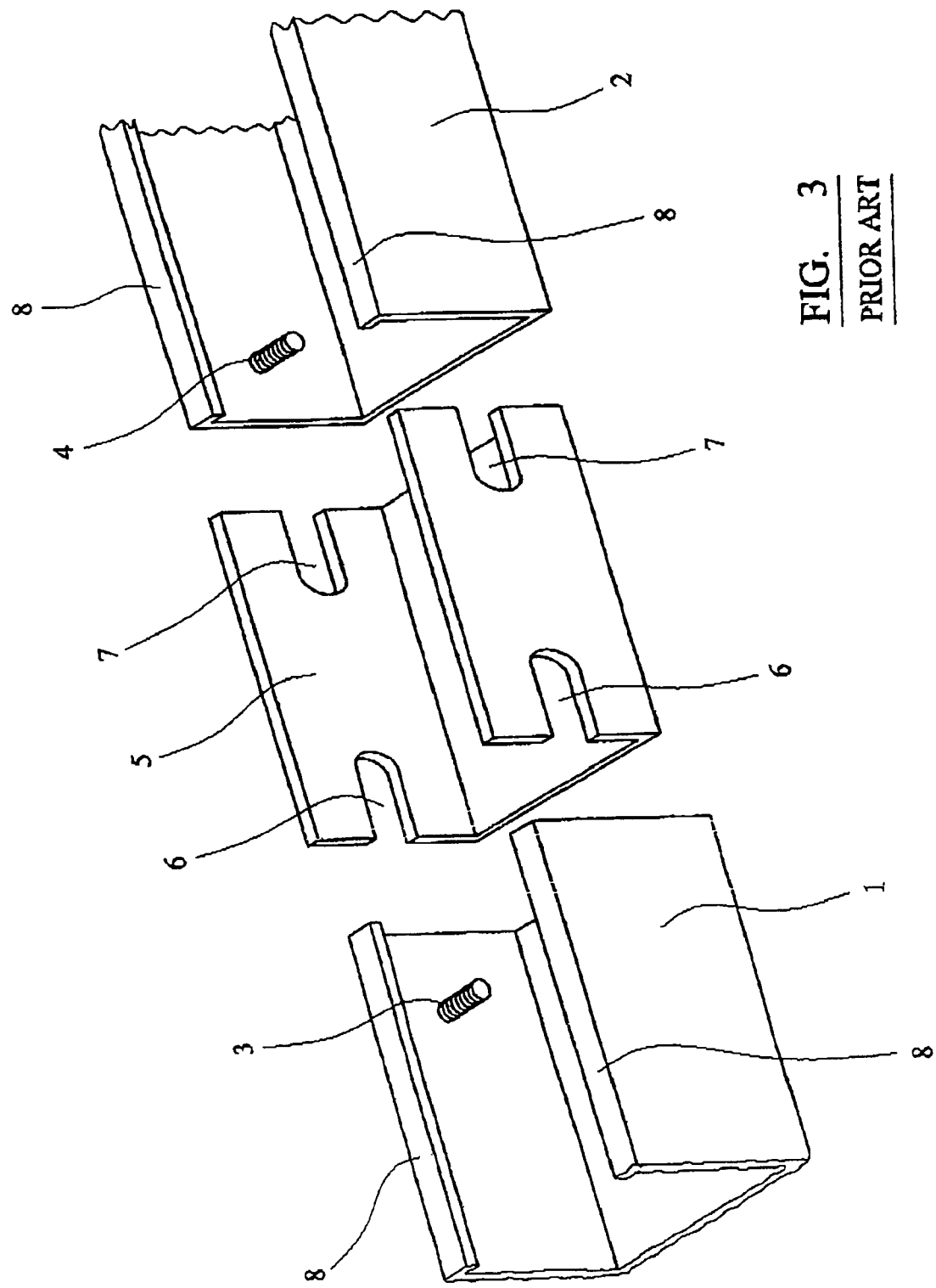
FIG. 3 is a perspective view of trunking sections and a coupling of the prior art.
Figure 4:
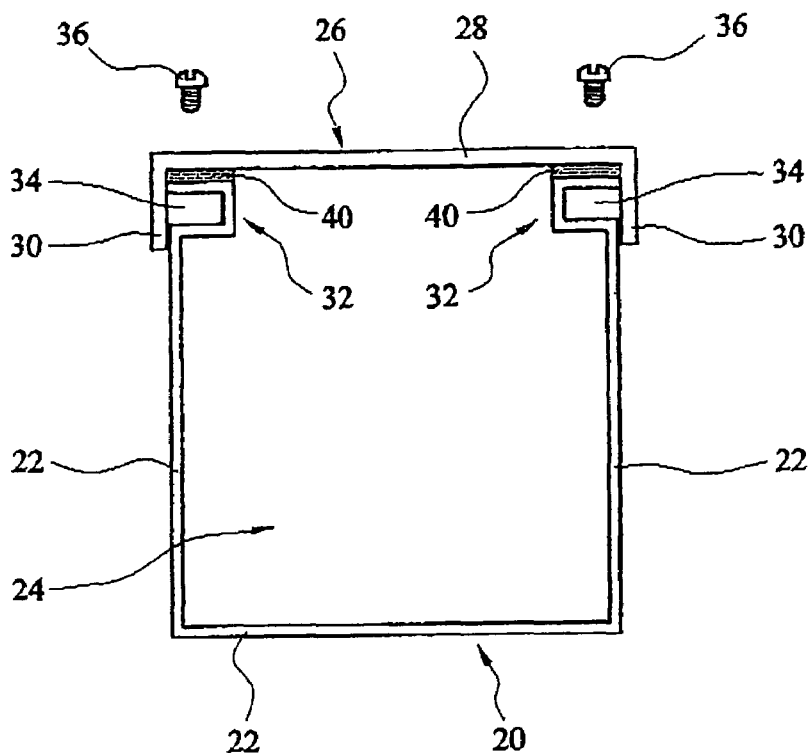
FIG. 4 is an end view of a trunking section and lid of the present invention.
Figure 5:
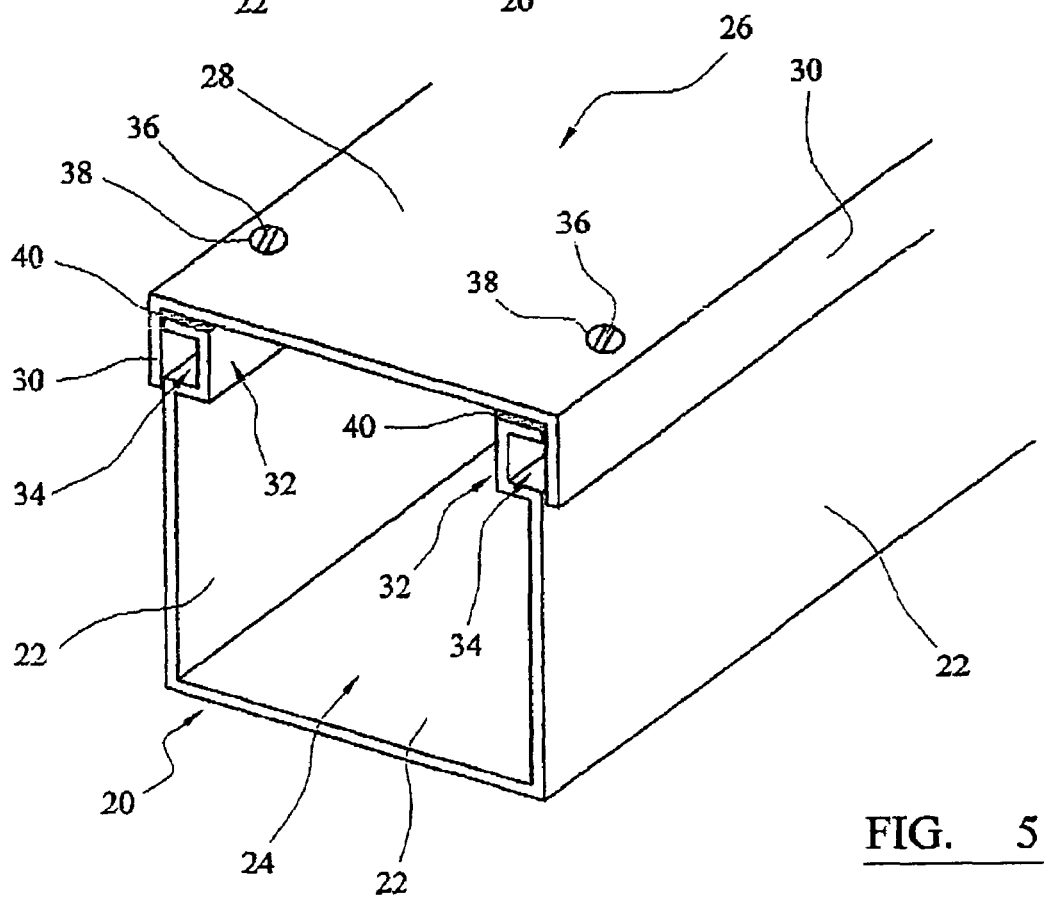
FIG. 5 is a perspective view of the trunking section of FIG. 4.

Referring to FIGS. 4 and 5, a section of trunking 20 has sides 22 which define a first channel 24 into which cables (not shown) are laid. Trunking 20 is adapted to have lid 26 located thereon. Lid 26 has surface 28 and edge portions 30 extending therefrom. Edge portions 32 of sides 22 are shaped so as to form channels 34. Retaining means in the form of holes and screws are used to fix the lid 26 to trunking section 20. Specifically screws 36 are inserted through holes 38 in lid 26 and extend through seals 40 through a further hole (not shown) in end portion 32 and into channel 34.

In use trunking section 20 has cables inserted into channel 24 and lid 26 is placed on trunking section 20. The side portions 30 of lid 26 extend over channels 34 so as to enclose them to form enclosed volumes. Screws 36 are used to fix lid 26 onto trunking section 20. Any water leaking through holes 38 and down the threads of screws 36 will be retained within channel 34 and may eventually dissipate between the side portion 30 of lid 26 and side 22 of trunking section 20.

Figure 6:
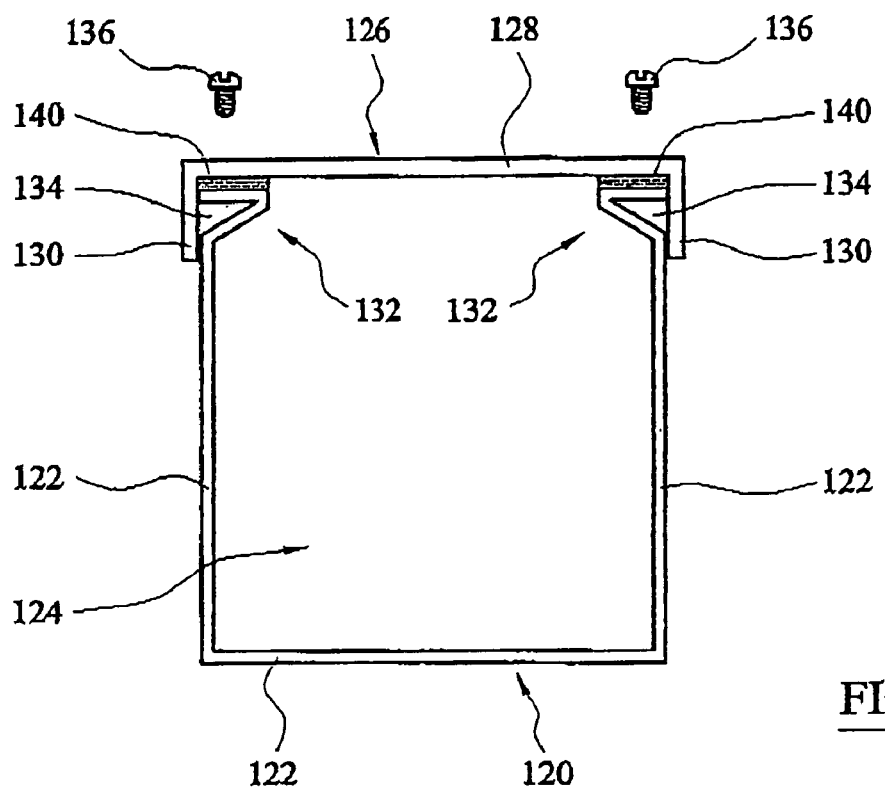
FIG. 6 is an end view of a trunking section and lid of the present invention.

Referring to FIG. 6, in which parts common with FIGS. 4 and 5 are denoted with like reference numerals increased by 100. End portions 132 of sides 122 of trunking section 120 form channels 134 with a smaller amount of sheet material used by forming channel 134 by making only two bends in side 122.

Figure 7:
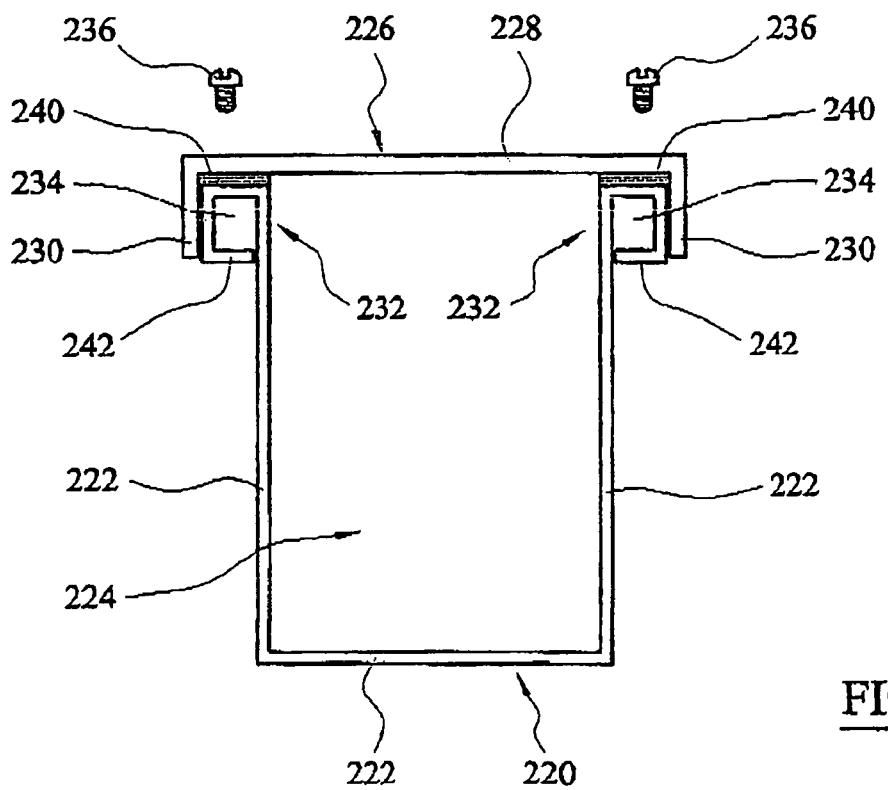
FIG. 7 is an end view of another trunking section and lid of the present invention.

Referring to FIG. 7, in which parts common with FIG. 6 are denoted with like reference numerals increased by 100. Channel 234, formed from end portion 232 of side 222 of trunking section 220 is external of channel 224. As a result, channel 234 is closed by a further portion 242 of side 222 and side portion 230 of lid 226 is not used to close channel 234.

Figure 8:
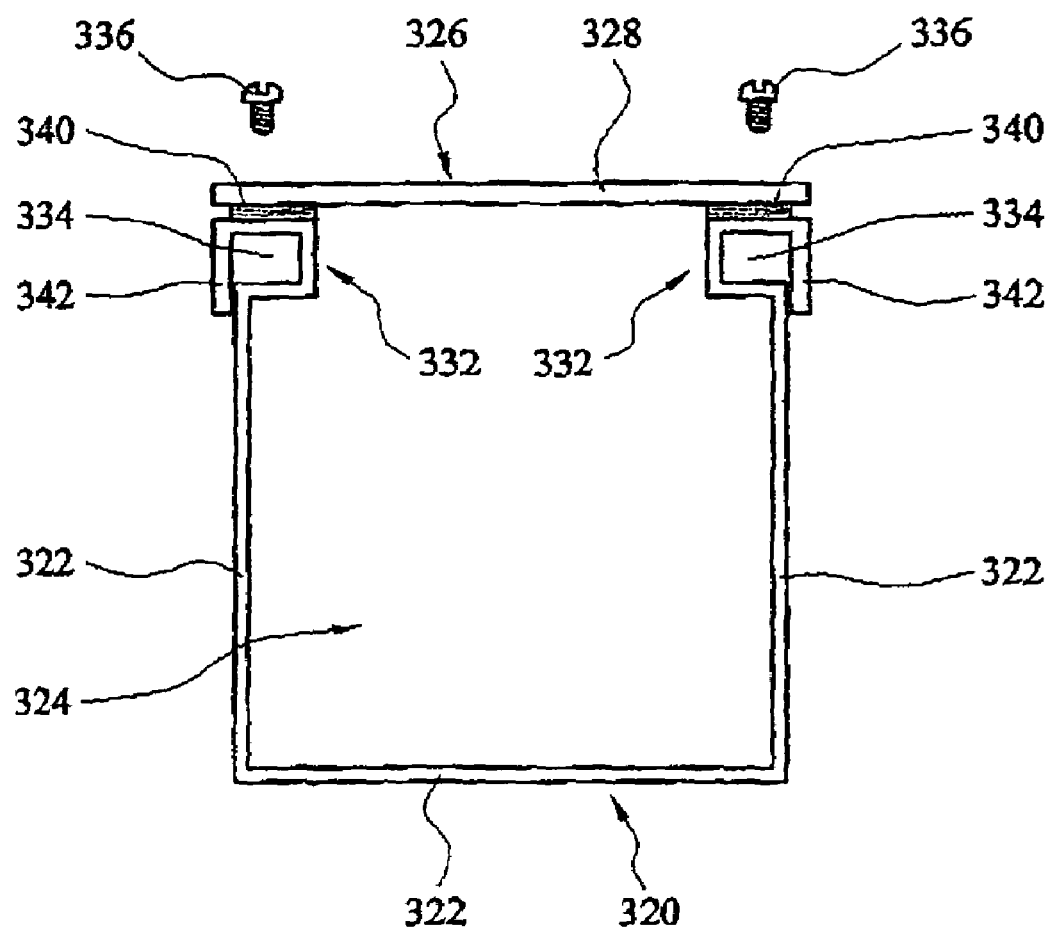
FIG. 8 is an end view of a further trunking section and lid of the present invention.

Referring to FIG. 8 in which parts common with FIG. 7 are denoted with like reference numerals increased by 20. In this embodiment channels 334 are internal of channel 324 and are closed by further portion 342 of side 322. As a result, lid 326 does not require side portions and is formed from a single planar sheet.

Figure 9:
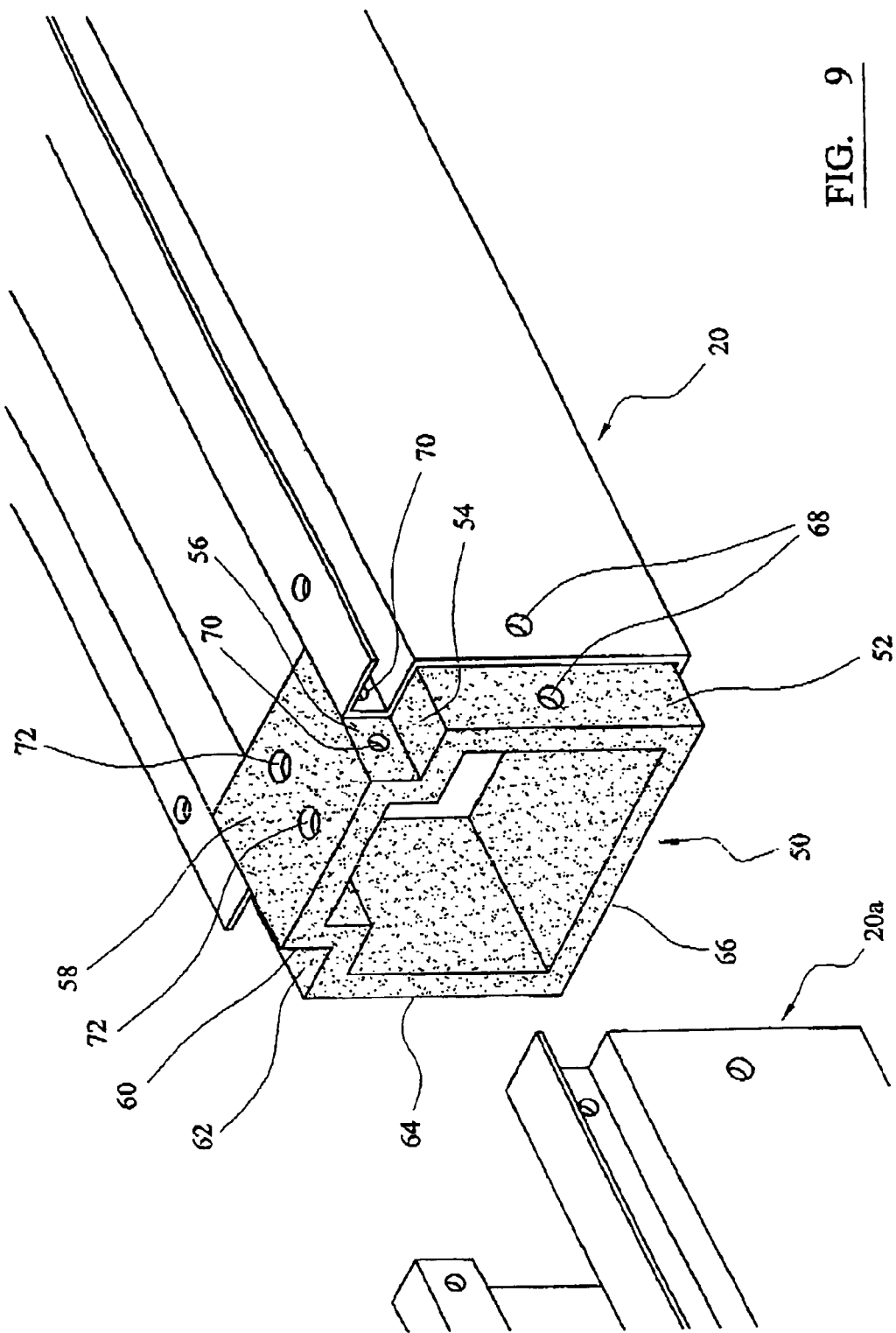
FIG. 9 is a perspective view of a coupling of the present invention.

Referring to FIG. 9, a trunking section 20 is coupled to a further trunking section 20a by coupling 50. Coupling 50 is formed from surfaces 52, 54, 56, 58, 60, 62, 64 and 66 which are adapted to engage internal surfaces of trunking sections 20 and 20a and their respective lids (not shown). Coupling 50 is provided with pairs of threaded holes 68, 70 and 72, and further pairs of threaded holes are in surfaces 60, 64 and 66 but are not shown in this figure. Coupling 50 is coated with a sealing coating, typically neoprene.

In use, coupling 50 is inserted into trunking 20 and then trunking 20a is butted up against trunking section 20. Screws (not shown) are inserted through holes in trunking sections 20 and 20a and into threaded holes 68 and 70 in coupling 50. Once the cables (not shown) are inserted within the trunking sections 20 and 20a and through coupling 50 the lids (not shown) cover trunking sections 20 and 20a. Further screws are inserted through holes in the lids and into threaded holes 72.

It will be appreciated by persons skilled in the art that the above embodiment has been described by way of example only, and not in any limitative sense, and that various alterations and modifications are possible with out departure from the scope of protection as defined by the appended claims. For example the screws or bolts that are used in conjunction with the retaining means could alternatively be turnbuckle type devices.

The invention claimed is:

1. A trunking section comprising:
   at least one side adapted to define a first channel for receiving electrical cables and adapted to receive at least one lid, thereby defining a first volume, at least two opposing edge portions of the side, or of at least two of the sides, being shaped so as to form at least two second channels, and at least one of a respective further portion of said side and a respective portion of at least one lid being adapted to close each second channel and thereby define at least two second volumes, further comprising at least one aperture extending into at least one said second volume, said at least one aperture being adapted to receive lid retaining devices therein.

2. A trunking section according to claim 1, wherein said first channel is an elongate channel.

3. A trunking section according to claim 1, wherein said second channel extends along the whole length of the respective side.

4. A trunking section according to claim 1, wherein said second channels are within said first volume.

5. A trunking section according to claim 1, wherein at least a portion of at least one of said sides is substantially planar and in use substantially vertical, and said second channel is defined by a first channel side extending substantially perpendicularly to said portion a second channel side extending substantially parallel to said side portion, and a third channel side extending substantially parallel to said first channel side.

6. A trunking section according to claim 5, wherein said second volumes are adapted to receive at least one lid retainer therein.

7. A trunking section according to claim 1, wherein said at least one aperture comprises a threaded hole and is adapted to receive at least one lid retainer in the form of a screw.

8. A trunking section comprising:
   at least one side adapted to define a first channel for receiving electrical cables and adapted to receive at least one lid, thereby defining a first volume, at least two opposing edge portions of the side, or of at least two of the sides, being shaped so as to form at least two second channels, and at least one of a respective further portion of said side and a respective portion of at least one lid being adapted to close each second channel and thereby define at least two second volumes;
   wherein at least a portion of at least one of said sides is substantially planar and in use substantially vertical, and said second channel is defined by a first channel side extending substantially perpendicularly to said portion, a second channel side extending substantially parallel to said side portion, a third channel side extending substantially parallel to said first channel side, and a fourth channel side substantially parallel to said second channel side, said first, second, third and fourth channel sides thereby defining said second volume.

9. A trunking section comprising:
   at least one side adapted to define a first channel for receiving electrical cables and adapted to receive at least one lid, thereby defining a first volume, at least two opposing edge portions of the side, or of at least two of the sides, being shaped so as to form at least two second channels, and at least one of a respective further portion of said side and a respective portion of at least one lid being adapted to close each second channel and thereby define at least two second volumes;
   wherein at least a portion of at least one of said sides is substantially planar and in use substantially vertical, and said second channel is defined by a first channel side extending substantially perpendicularly to said portion, a second channel side extending substantially parallel to said side portion, and a third channel side extending substantially parallel to said first channel side;
   wherein said second volumes are adapted to receive at least one lid retainer therein;
   wherein a portion of said side is provided with a threaded hole and adapted to receive at least one lid retainer in the form of a screw.

10. A method, comprising:
    carrying a plurality of electrical cables utilizing a trunking section;
    wherein the trunking section includes at least one side adapted to define a first channel for receiving said electrical cables and adapted to receive at least one lid, thereby defining a first volume, at least two opposing edge portions of the side, or of at least two of the sides, being shaped so as to form at least two second channels, and at least one of a respective further portion of said side and a respective portion of at least one lid being adapted to close each second channel and thereby define at least two second volumes;
    wherein at least a portion of at least one of said sides is substantially planar and in use substantially vertical, and at least one of said second channels is defined by a first channel side extending substantially perpendicular to said portion, a second channel side extending substantially parallel to said side portion, a third channel side extending substantially parallel to said first channel side, and a fourth channel side substantially parallel to said second channel side, said first, second, third and fourth channel sides thereby defining at least one of said second volumes.

11. A method according to claim 10, wherein said first channel is an elongate channel.

12. A method according to claim 10, wherein at least one of said second channels extends along the whole length of the respective side.

13. A method according to claim 10, wherein said second channels are within said first volume.

14. A method according to claim 10, wherein said second volumes are adapted to receive at least one lid retainer therein.

* * * * *